US009171156B1

United States Patent
Bogorad et al.

(10) Patent No.: US 9,171,156 B1
(45) Date of Patent: *Oct. 27, 2015

(54) SYSTEMS AND METHODS FOR MANAGING MALWARE SIGNATURES

(71) Applicant: Symantec Corporation, Mountain View, CA (US)

(72) Inventors: Walter Bogorad, Danville, CA (US); Vadim Antonov, Belmont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/492,754

(22) Filed: Sep. 22, 2014

Related U.S. Application Data

(63) Continuation of application No. 12/754,586, filed on Apr. 5, 2010, now Pat. No. 8,875,292.

(51) Int. Cl.
G06F 21/56 (2013.01)
H04L 29/06 (2006.01)

(52) U.S. Cl.
CPC .......... *G06F 21/564* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 5,960,170 A | * | 9/1999 | Chen et al. | 714/38.14 |
| 7,150,043 B2 | * | 12/2006 | Brock et al. | 726/23 |
| 2002/0194487 A1 | * | 12/2002 | Grupe | 713/200 |

* cited by examiner

*Primary Examiner* — Gilberto Barron, Jr.
*Assistant Examiner* — Devin Almeida
(74) *Attorney, Agent, or Firm* — ALG Intellectual Property, LLC

(57) ABSTRACT

A computer-implemented method for managing malware signatures. The method may include maintaining a set of active malware signatures and maintaining a set of dormant malware signatures. The method may also include providing the set of active malware signatures for use in malware detection more frequently than the set of dormant malware signatures and determining that a first malware signature from the set of dormant malware signatures triggers one or more positive malware detection responses. The method may further include, in response to the determination, moving the first malware signature from the set of dormant malware signatures to the set of active malware signatures. Various other methods, systems, and computer-readable media are also disclosed.

20 Claims, 6 Drawing Sheets

SYSTEMS AND METHODS FOR MANAGING MALWARE SIGNATURES

CROSS REFERENCE TO RELATED APPLICATION

This application is a continuation of U.S. application Ser. No. 12/754,586, filed 5 Apr. 2010, the disclosure of which is incorporated, in its entirety, by this reference.

BACKGROUND

Antivirus and antispyware solutions generally employ traditional scan-based technologies to identify viruses, worms, Trojan horses, spyware, and other malware on an endpoint device. Typical antivirus and antispyware solutions may detect these threats by searching a system for files that match characteristics (e.g., malware signatures) of a known threat. Once it detects the threat, the solution may remediate it, typically by deleting or quarantining it.

As the number of malware threats increase, the sizes of signature databases that identify these threats also increase. Large malware signature databases may be undesirable for a variety of reasons. For example, adding malware signatures to a signature database on a client device may result in increased disk footprint and additional consumption of CPU cycles and memory during malware scans. Similarly, server-side lookups may take longer and consume more resources as server-side signature databases grow. Furthermore, the larger the database, the higher the likelihood of triggering false positive detections. What is needed, therefore, is a more efficient and effective mechanism for managing malware databases.

SUMMARY

As will be described in greater detail below, the instant disclosure generally relates to systems and methods for managing malware signatures. For example, a system for managing malware signatures may include a database configured to store a set of active malware signatures and a set of dormant malware signatures. The system may also include a provisioning module programmed to provide the set of active malware signatures for use in malware detection more frequently than the set of dormant malware signatures.

The system may provision malware signatures in a variety of ways. For example, in embodiments where the malware signatures are stored on clients, the provisioning module may send the set of active malware signatures to a first set of clients and may send the set of dormant malware signatures to a second, smaller set of clients. In embodiments where malware signatures are not provided to clients, the provisioning module may use the set of active malware signatures in a plurality of server-side signature lookups and may use the set of dormant malware signatures in only a portion of the plurality of server-side signature lookups.

The system may include a determination module programmed to direct the processor to determine that a first malware signature from the set of dormant malware signatures triggers one or more positive malware detection responses in one or more malware detection scans. As an example, the determination module may determine that the first malware signature triggers positive malware detection responses a predetermined number of times. Additionally or alternatively, the determination module may determine that the first malware signature triggers positive responses at a predetermined rate.

The system may further include an update module programmed to move the first malware signature from the set of dormant malware signatures to the set of active malware signatures. In embodiments where the signatures are stored on clients, the update module may move the first malware signature by providing the first malware signature to each client in the first set of clients.

In some embodiments, the system may determine that an active malware signature has become dormant. For example, the determination module may determine that a second malware signature from the set of active malware signatures triggers positive malware detection responses at a rate that is less than a predetermined threshold. In such embodiments, the update module may, in response to determining that the second malware signature triggers positive malware detection responses at the rate that is less than the predetermined threshold, move the second malware signature from the set of active malware signatures to the set of dormant malware signatures.

According to certain embodiments, the system may use more than two tiers of activity to manage malware signatures. For example, in addition to storing sets of active and dormant malware signatures, the system may store a set of semi-active malware signatures. In such embodiments, the provisioning module may be programmed to provide the set of semi-active malware signatures for use in malware detection more frequently than the set of dormant malware signatures and less frequently than the set of active malware signatures. In other words, the set of semi-active malware signatures may be used more (e.g., sent to more clients and/or applied to a higher percentage of malware detection queries) than the set of dormant malware signatures and used less than the set of active malware signatures. In this example, the determination module may determine that a malware signature from the set of dormant malware signatures triggers positive malware detection responses at a rate that is greater than a predetermined threshold for dormant malware signatures and less than a predetermined threshold for active malware signatures. Thus, the update module may move the second malware signature from the set of dormant malware signatures to the set of semi-active malware signatures.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
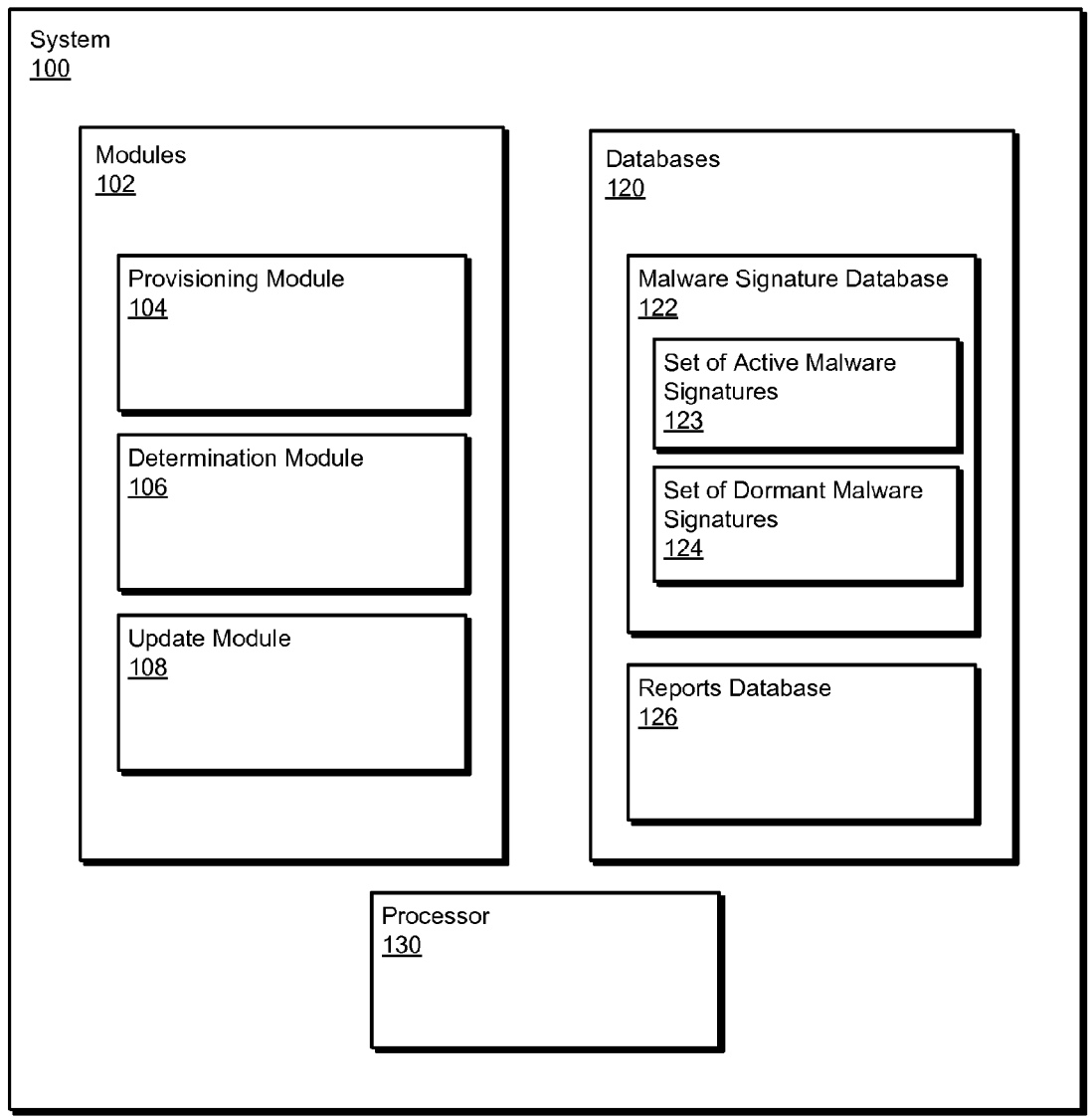
FIG. 1 is a block diagram of an exemplary system for managing malware signatures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing malware signatures. For example, a system may provide active malware signatures (e.g., malwares signatures for a threat that may be prevalent in a community) for use in more malware scans than dormant malware signatures (e.g., malware signatures for a threat that may be less prevalent in the community). If a particular threat becomes more prevalent, the system may change a malware signature associated with the threat from dormant status to active status. Conversely, if a threat becomes less prevalent, the system may change a malware signature associated with the threat from active status to dormant status. Such a system may reduce the size of active malware signature databases and may therefore improve the performance of client-side and/or server-side anti-malware products. Embodiments of the instant disclosure may also reduce false-positive malware detection and provide various other features and advantages over prior systems.

Figure 2:
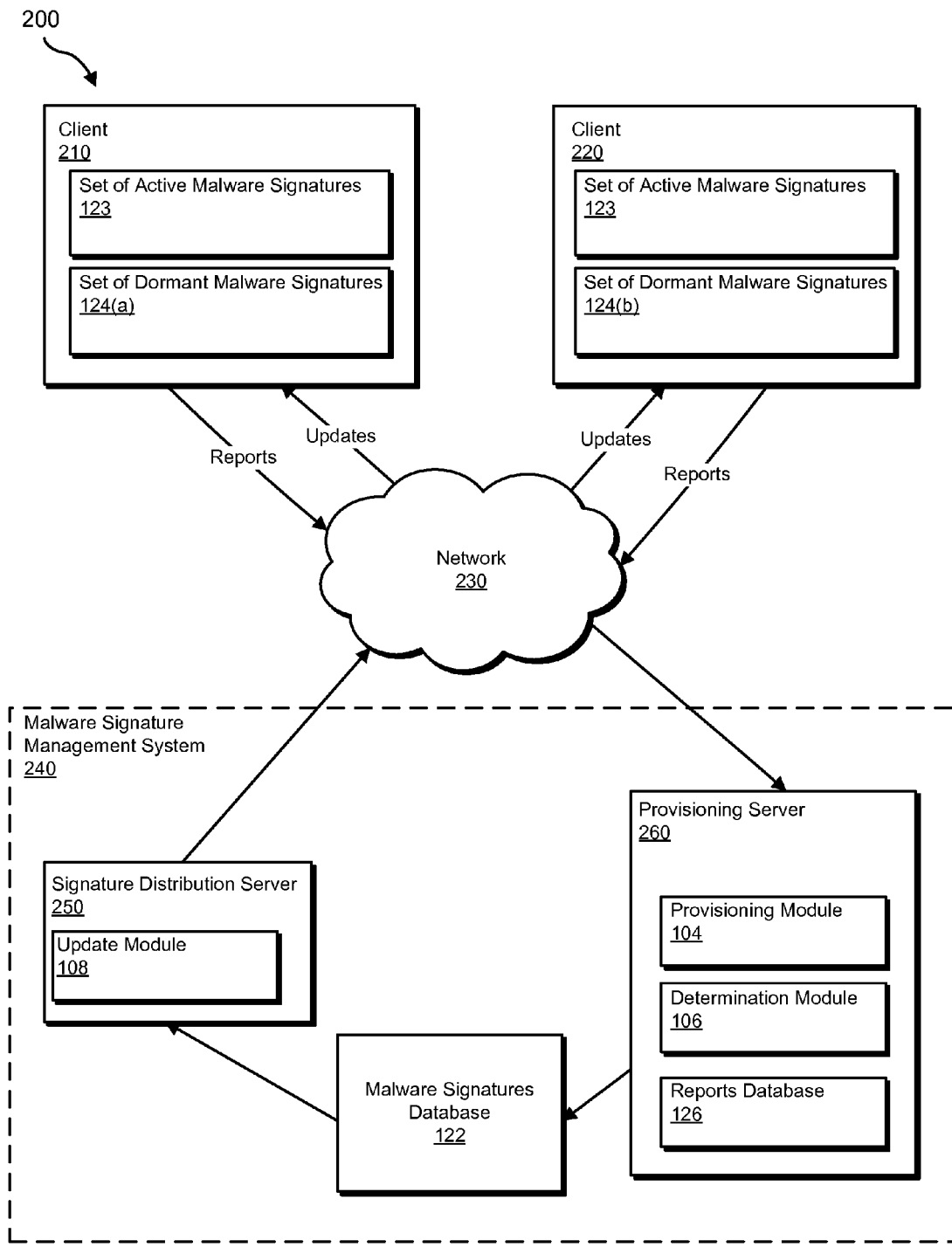
FIG. 2 is a block diagram of another exemplary system for managing malware signatures.
Figure 3:
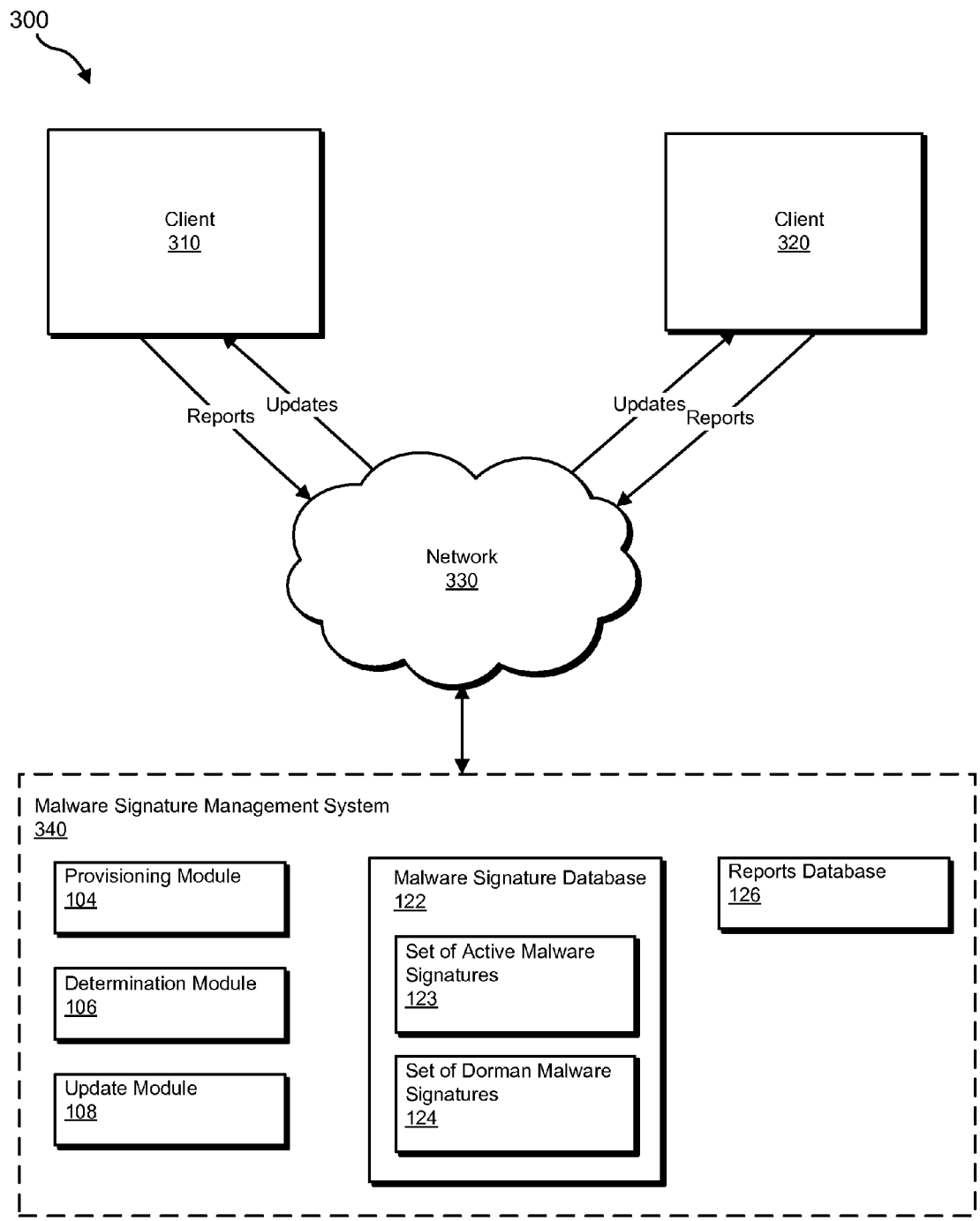
FIG. 3 is a block diagram of an alternative system for managing malware signatures.

The following will provide, with reference to FIGS. 1-3, detailed descriptions of exemplary systems for managing malware signatures. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for managing malware signatures. Exemplary system 100 may include one or more modules 102 for performing one or more tasks. For example, and as will be explained in greater detail below, exemplary system 100 may include a provisioning module 104 programmed to direct processor 130 to provide a set of active malware signatures 123 for use in malware detection more frequently than a set of dormant malware signatures 124.

Exemplary system 100 may also include a determination module 106 programmed to direct processor 130 to determine that a first malware signature from set of dormant malware signatures 124 triggers one or more positive malware detection responses in one or more malware detection scans. In addition, and as will be described in greater detail below, exemplary system 100 may include an update module 108 programmed to direct processor 130 to, in response to the determination, move the first malware signature from set of dormant malware signatures 124 to set of active malware signatures 123. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., client 210, client 220, signature distribution server 250, and/or provisioning server 260), the devices illustrated in FIG. 3 (e.g., client 310, client 320, and/or malware signature management system 340), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may include a processor 130. Processor 130 generally represents any type or form of processing unit, such as processor 514 in FIG. 5, capable of processing data and/or interpreting and executing instructions. Processor 130 may be configured to execute one or more of modules 102. In addition to processor 130, system 100 may include one or more databases 120. Databases 120 may represent portions of a single database or computing device or a plurality of databases or computing devices. In one embodiment, exemplary system 100 may include a malware signature database 122 for storing a set of active malware signatures 123 and a set of dormant malware signatures 124. System 100 may also include a reports database 126 for storing one or more results of one or more malware scans.

Databases 120 in FIG. 1 may represent a portion of one or more computing devices. For example, databases 120 may represent a portion of malware signature management system 240 in FIG. 2, malware signature management system 340 in FIG. 3, computing system 510 in FIG. 5, and/or portions of exemplary network architecture 600 in FIG. 6. Alternatively, databases 120 in FIG. 1 may represent one or more physically separate devices capable of being accessed by a computing device, such as computing system 510 in FIG. 5 and/or portions of exemplary network architecture 600 in FIG. 6.

Exemplary system 100 in FIG. 1 may be deployed in a variety of ways. In some embodiments, system 100 may be deployed as a system that stores malware signatures locally on client devices. An example of such a system is illustrated in FIG. 2. Alternatively, system 100 may be deployed as a system that only stores malware signatures on one or more servers remote from the protected clients. For example, all or a portion of exemplary system 100 may represent portions of a cloud-computing or network-based environment, such as exemplary system 300 illustrated in FIG. 3. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a client 210 and a client 220 in communication with a malware signature management system 240 over a network 230. In one embodiment, and as will be described in greater detail below, clients 210 and 220 represent end-point devices protected, at least in part, by malware signature management system 240. For example, malware signature management system 240 may provide malware signatures that clients 210 and 220 may use when scanning for malware.

Clients 210 and 220 may store set of active malware signatures 123. In some examples, client 210 may also store a set of dormant malware signatures 124(*a*) and client 220 may store a set of dormant malware signatures 124(*b*). Clients 210 and 220 generally represent any type or form of computing device capable of reading computer-executable instructions. Examples of clients 210 and 220 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Malware signature management system 240 generally represents any system that provides malware signatures to client devices. Malware signature management system 240 may include one or more servers and/or other computing and storage devices. For example, malware signature management system 240 may include a signature distribution server 250, which may include update module 108. Signature distribution server 250 generally represents any type or form of computing device that is capable of providing malware signatures to one or more client devices. Examples of signature distribution server 250 include, without limitation, application servers and database servers configured to provide various database services and/or run certain software applications.

Malware signature management system 240 may also include a provisioning server 260, which may include provisioning module 104, determination module 106, and reports database 126. Provisioning server 260 generally represents any type or form of computing device that is capable of using malware reports to sort malware signatures into active sets, dormant sets, and/or various other malware signature groupings. Examples of provisioning server 260 include, without limitation, application servers and database servers configured to provide various database services and/or run certain software applications. In addition to provisioning server 260 and signature distribution server 250, malware signature management system 240 may include malware signature database 122.

While FIG. 2 illustrates signature distribution server 250, provisioning server 260, and malware signature database 122 as separate devices, the functionality of each of these components may be provided in a single device and/or any other suitable device configuration. Furthermore, while FIG. 2 only shows 2 clients, malware signature management system 240 may provide malware signatures to any number of clients.

As noted, client 210, client 220, and malware signature management system 240 may communicate over network 230. Network 230 generally represents any medium or architecture capable of facilitating communication or data transfer. Examples of network 230 include, without limitation, an intranet, a Wide Area Network ("WAN"), a Local Area Network ("LAN"), a Personal Area Network ("PAN"), the Internet, Power Line Communications ("PLC"), a cellular network (e.g., a GSM Network), exemplary network architecture 600 in FIG. 6, or the like. Network 230 may facilitate communication or data transfer using wireless or wired connections.

As an example of how system 200 may manage malware signatures, malware signature management system 240 may distribute set of active signatures 123 to clients 210 and 220. Malware signature management system 240 may also distribute set of dormant malware signatures 124(*a*) to client 210 and set of dormant malware signatures 124(*b*) to client 220. Sets of dormant malware signatures 124(*a*) and (*b*) may represent different subsets of set of malware signatures 124. By dividing set of dormant malware signatures 124 among multiple clients (e.g., only sending a portion of the dormant malware signatures to each client), malware signature management system 240 may reduce the resource load on each client while still continuing to check for occurrences of dormant malware. Additional discussion detailing how malware signature management system 240 maintains malware signature database 122 is provided in the discussion corresponding to FIG. 4.

Turning to FIG. 3, system 300 may include a client 310 and a client 320 in communication with a malware signature management system 340 over a network 330. In one embodiment, and as will be described in greater detail below, clients 310 and 320 represent end-point devices protected, at least in part, by malware signature management system 340. For example, clients 310 and 320 may send file signatures to malware signature management system 340 to be compared against malware signatures maintained by malware signature management system 340.

Clients 310 and 320 generally represent any type or form of computing device capable of reading computer-executable instructions. Examples of clients 310 and 320 include, without limitation, laptops, desktops, servers, cellular phones, personal digital assistants ("PDAs"), multimedia players, embedded systems, combinations of one or more of the same, exemplary computing system 510 in FIG. 5, or any other suitable computing device.

Malware signature management system 340 generally represents any system that receives malware detection requests (e.g., file signatures) from clients and provides responses to such requests. Examples of malware signature management system 340 include, without limitation, one or more application servers and/or database servers configured to provide various database services and/or run modules disclosed herein.

For example, malware signature management system 340 may include provisioning module 104, determination module 106, and update module 108. Malware signature management system 340 may also include malware signature database 122, which may include set of active malware signatures 123 and set of dormant malware signatures 124. Malware signature management system 340 may further include reports database 126.

As noted, client 310, client 320, and malware signature management system 340 may communicate over network 330. Network 330 generally represents any medium or architecture capable of facilitating communication or data transfer. Examples of network 330 include, without limitation, an intranet, a Wide Area Network ("WAN"), a Local Area Network ("LAN"), a Personal Area Network ("PAN"), the Internet, Power Line Communications ("PLC"), a cellular network (e.g., a GSM Network), exemplary network architecture 600 in FIG. 6, or the like. Network 330 may facilitate communication or data transfer using wireless or wired connections.

As an example of how system 300 may manage malware signatures, malware signature management system 340 may store set of active malware signatures 123 and set of dormant malware signatures 124 for use in determining whether file signatures sent from clients 310 and 310 represent malware. Malware signature management system 340 may compare each malware signature in set of active malware signatures 123 to each incoming file signature from clients 310 and 320. In contrast, malware signature management system 340 may only compare malware signatures in set of dormant malware signatures 124 with a portion of the file signatures sent from clients 310 and 320. For example, malware signature management system 340 may only use set of dormant malware signatures 124 for comparison to a predetermined percentage of file signatures sent from clients 310 and 320. Various other examples and processes for performing server-side lookups are presented in the discussion corresponding to FIG. 4.

Figure 4:
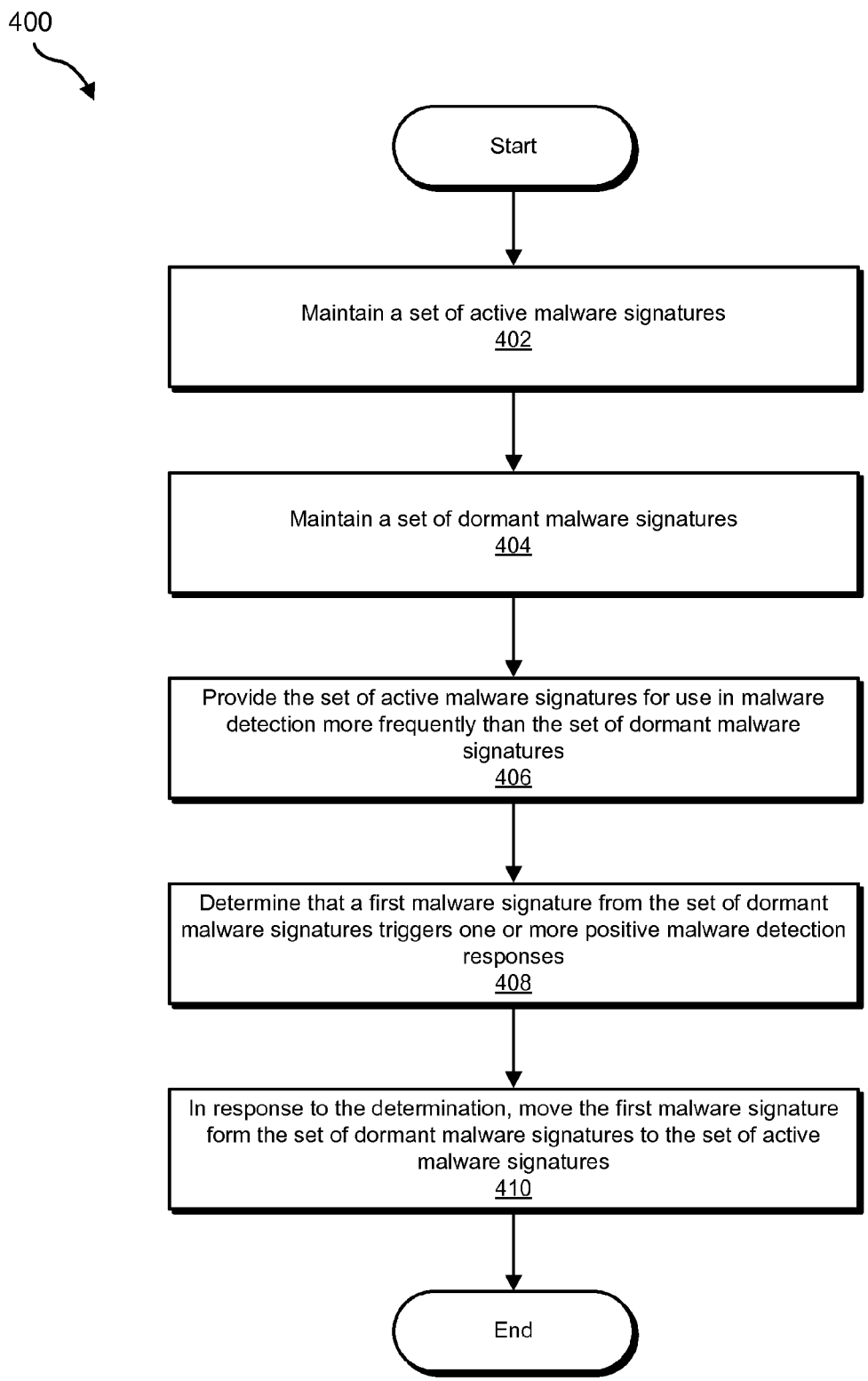
FIG. 4 is a flow diagram of an exemplary method for managing malware signatures.

FIG. 4 is a flow diagram of an exemplary computer-implemented method for managing malware signatures. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, and/or system 300 in FIG. 3.

At step 402 in FIG. 4, one or more of the systems described herein may maintain a set of active malware signatures. For example, malware signature database 122 in FIG. 1 may store set of active malware signatures 123. In the example shown in FIG. 2, malware signatures may be maintained by malware signature management system 240, and in the example shown in FIG. 3, malware signatures may be maintained by malware signature management system 340. As used herein, the phrase "maintaining malware signatures" generally refers to any process for storing, selecting, updating, categorizing, and/or distributing malware signatures.

As used herein, the term "malware signature" generally refers to a fingerprint, hash, and/or any other representation or identifying characteristic of a malware threat (e.g., a virus, a worm, a Trojan horse, spyware, etc.). For example, a malware signature may include a hash of a malware file (e.g., a cryptographic hash such as MD5, SHA1, etc.).

As used herein, the phrase "active malware signature" generally refers to any malware signature associated with an active malware threat. In some embodiments, a malware threat and its corresponding signature may be considered active if the malware is relatively prevalent within a community. Prevalence may be determined in a number of ways. In some embodiments, if malware is detected at or above a predetermined rate, the malware may be considered to be prevalent. As an example, if the malware is detected at a rate of greater than 1000 occurrences per day within the United States, the malware may be considered to be prevalent within the United States, and any signature associated with the malware threat may be deemed active. Prevalence may also be determined using any other suitable algorithm and/or heuristic, and thresholds for determining prevalence may be set at any suitable level.

Prevalence may be defined based on a variety of different types of communities. For example, prevalence may be defined for geographic regions (e.g., by state, by country, globally, etc.). Alternatively, prevalence may be defined based on certain user bases, such as users within an enterprise, university, or any other organization. For example, malware may be considered to be prevalent within a student body at a university if the malware is detected more than 25 times per day.

At step 404 in FIG. 4, one or more of the systems described herein may maintain a set of dormant malware signatures. For example, malware signature database 122 in FIG. 1 may store set of dormant malware signatures 124. Like set of active malware signatures 123, set of dormant malware signatures 124 may be managed by malware signature management system 240 in FIG. 2 and/or malware signature management system 340 in FIG. 3. Set of dormant malware signatures 124 may be maintained using any of the techniques described for active malware signatures in step 402.

As used herein, the phrase "dormant malware signatures" generally refers to malware signatures that represent malware threats that are not relatively prevalent within a community. For example, if a particular threat is detected at a rate that is less than a predetermined threshold, the threat may be considered to be dormant and malware signatures representing the threat may be considered to be dormant malware signatures. As an example, if the threshold for active malware is set at 1000 occurrences per day within the United States, and a malware threat is only detected 10 times per day within the United States, the malware threat may be considered to be dormant and malware signatures associated with the malware threat may be dormant malware signatures.

At step 406 in FIG. 4, one or more of the systems described herein may provide the set of active malware signatures for use in malware detection more frequently than the set of dormant malware signatures. For example, provisioning module 104 may provide set of active malware signatures 123 for use in malware detection more frequently than set of dormant malware signatures 124.

Provisioning module 104 may provide set of active malware signatures 123 for use in malware detection more frequently than set of dormant malware signatures 124 in a variety of ways. In one example, provisioning module 104 may provide set of active malware signatures 123 to a first set of clients and set of dormant malware signatures 124 to a second set of clients that includes less clients than the first set of clients. In some embodiments, the second set of clients may be a subset of the first set of clients. Alternatively, some or all of the clients in the second set of clients may be different clients than the clients in the first set of clients.

In embodiments where clients store malware signatures, since more clients have received the set of active malware signatures than the set of dormant malware signatures, the set of active malware signatures may be used more in malware detection scans. For example, 10,000 clients may receive the set of active malware signatures while only 2,000 clients may receive the set of dormant malware signatures.

In some embodiments, the set of dormant malware signatures includes two or more subsets of malware signatures. In the example shown in FIG. 2, set of dormant malware signatures 124 may be divided up into subsets and may be distributed amongst multiple clients and/or sets of clients such that all of the dormant malware signatures are being used in at least a portion of scans being performed by the clients. For example, client 210 may receive half of the set of dormant malware signatures as set of dormant malware signatures 124(a) and client 220 may receive the other half of dormant malware signatures 124 as set of dormant malware signatures 124(b). If there are 70,000 dormant malware signatures, 35,000 of the dormant malware signatures may be sent to client 210 and the other 35,000 may be sent to client 220.

Dormant malware signatures may be divided up and sent to clients using any other suitable algorithm or heuristic. For example, clients may be divided into groups and distributed based on communities and/or any other suitable characteristic. In some examples, groups may be defined such that each group includes at least one client from a predefined community. As an example, if communities are defined as the 50 states in the United States and the dormant malware signatures are divided into 20 groups, each group of malware signatures may be sent to at least one client in each state. Thus, if dormant malware becomes active within a particular geographic region (or other community), the dormant malware may be detected within that particular community.

In the previous examples, all of the dormant malware signatures are divided up and sent to different groups of clients.

Alternatively, only a portion of the dormant malware signatures maintained by a system may be distributed to one or more clients or sets of clients. For example, dormant malware signatures may be divided into two or more groups that are periodically rotated through a set of clients. In this example, a first set of dormant malware signatures may be sent to a client for a first period of time (e.g., a week, a month, etc.). At the end of the first period of time, the first set of dormant malware signatures may be removed from the client or changed to inactive status on client such that they are not used during malware scans. Then, a second set of malware signatures may be sent to the client for use during a second period of time.

In other embodiments, the sets of active and dormant malware signatures may not be distributed to clients. Instead, the malware signatures may be stored in the cloud for use in server-side lookups, as shown in example provided in FIG. 3. In such embodiments, providing the set of active malware signatures for use in malware detection more frequently than the set of dormant malware signatures may include using the set of active malware signature for server-side lookups more frequently than the set of dormant malware signatures. For example, provisioning module 104 may provide set of active malware signatures 123 for use in a plurality of server-side lookups. In contrast, set of dormant malware signatures 124 may only be used in a portion of the plurality of server-side signature lookups. For example, only one in 10 requests from clients 310 and 320 may be compared against set of dormant malware signatures 124, while all requests from clients 310 and 320 may be compared against set of active malware signatures 123.

In some embodiments, as previously discussed, set of dormant malware signatures 124 may be divided into two or more subsets. For example, set of dormant malware signatures 124 may be divided into ten subsets, and provisioning module 104 may rotate through each of the subsets when responding to client requests. For example, provisioning module 104 may provide the first subset of dormant malware signatures for server-side comparison to a first file signature sent by a client, provisioning module 104 may provide the second subset of dormant malware signatures for server-side comparison to a second file signature sent by a client, and so forth. Dormant malware signatures may be divided up and applied to incoming client requests using any other suitable algorithm or heuristic.

At step 408 in FIG. 4, one or more of the systems described herein may determine that a first malware signature from the set of dormant malware signatures triggers one or more positive malware detection responses in one or more malware detection scans. For example, determination module 106 in FIG. 1 may determine that reports database 126 indicates that a dormant malware signature has triggered positive malware detection responses. In response to such a determination, update module 108 may, at step 410 in FIG. 4, move the first malware signature from the set of dormant malware signatures to the set of active malware signatures. Moving the first malware signature may include providing the first malware signature to additional clients.

Determining that the first malware signature from the set of dormant malware signatures triggers one or more positive malware detection responses may include determining that the first malware signature triggers positive responses at a predetermined rate. If the first malware signature triggers positive responses at a rate equal to or greater than the predetermined rate, update module 108 may reclassify the malware signature as an active malware signature. Alternatively, update module 108 may reclassify dormant malware signatures as active malware signatures if the dormant malware signatures trigger a predetermined number of positive responses. For example, once malware has been detected a certain number of times (e.g., 100 times), a signature associated with the malware may be transitioned from a dormant state to an active state (i.e., moved from a set of active malware signatures to a set of dormant malware signatures). In another example, once malware is detected a single time, a signature associated with the malware may be transitioned from a dormant state to an active state.

Update module 108 may also move malware signatures from the set of active malware signatures to the set of dormant malware signatures. For example, determination module 106 may determine that a malware signature from set of active malware signatures 123 may trigger positive malware detection responses at a rate that is less than a predetermined threshold. In response, update module 108 may move the active malware signature from the set of active malware signatures to the set of dormant malware signatures.

In some examples, more than two categories for malware signatures may be used to manage malware signatures. Indeed, any suitable number of categories may be used to manage malware signatures. As an example, a set of semi-active malware signatures may be stored in malware signature database 122. The set of semi-active malware signatures may be provided for use in a third set of malware detection scans. The third set of malware detection scans may include less scans than the first set of malware detection scans and more malware detection scans than the second set of malware detection scans. In other words, the semi-active malware signatures may be used more frequently than dormant malware signatures and less frequently than active malware signatures. In such an example, if a malware signature from the set of dormant malware signatures triggers positive malware detection responses at a rate that is greater than a predetermined threshold for dormant malware signatures and less than a predetermined threshold for active malware signatures, the malware signature may be moved from dormant status to semi-active status.

Figure 5:
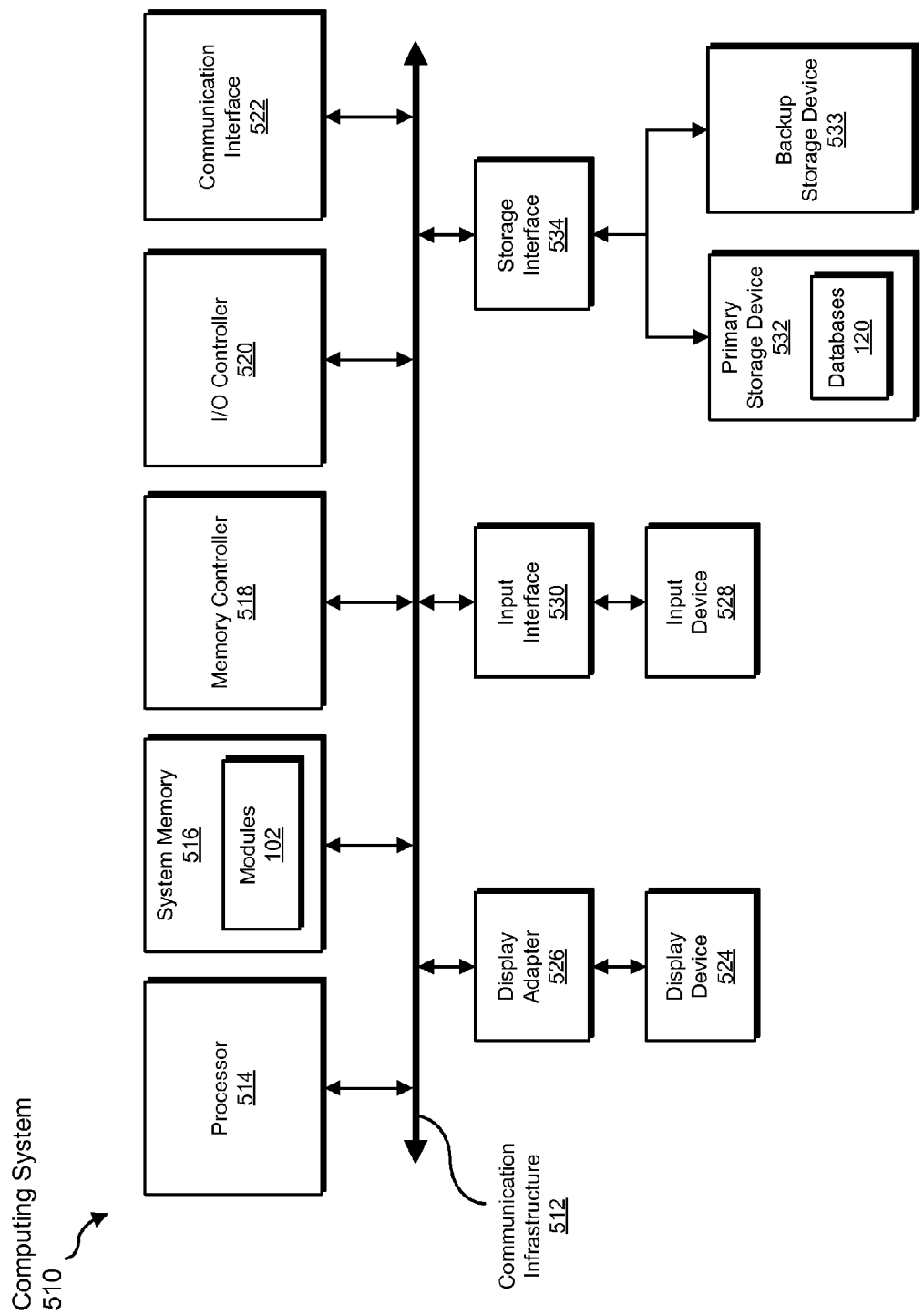
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the maintaining, providing, determining, moving, sending, and using steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions.

Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as maintaining, providing, determining, moving, sending, and using.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the maintaining, providing, determining, moving, sending, and using steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the maintaining, providing, determining, moving, sending, and using steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the maintaining, providing, determining, moving, sending, and using steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the maintaining, providing, determining, moving, sending, and using steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
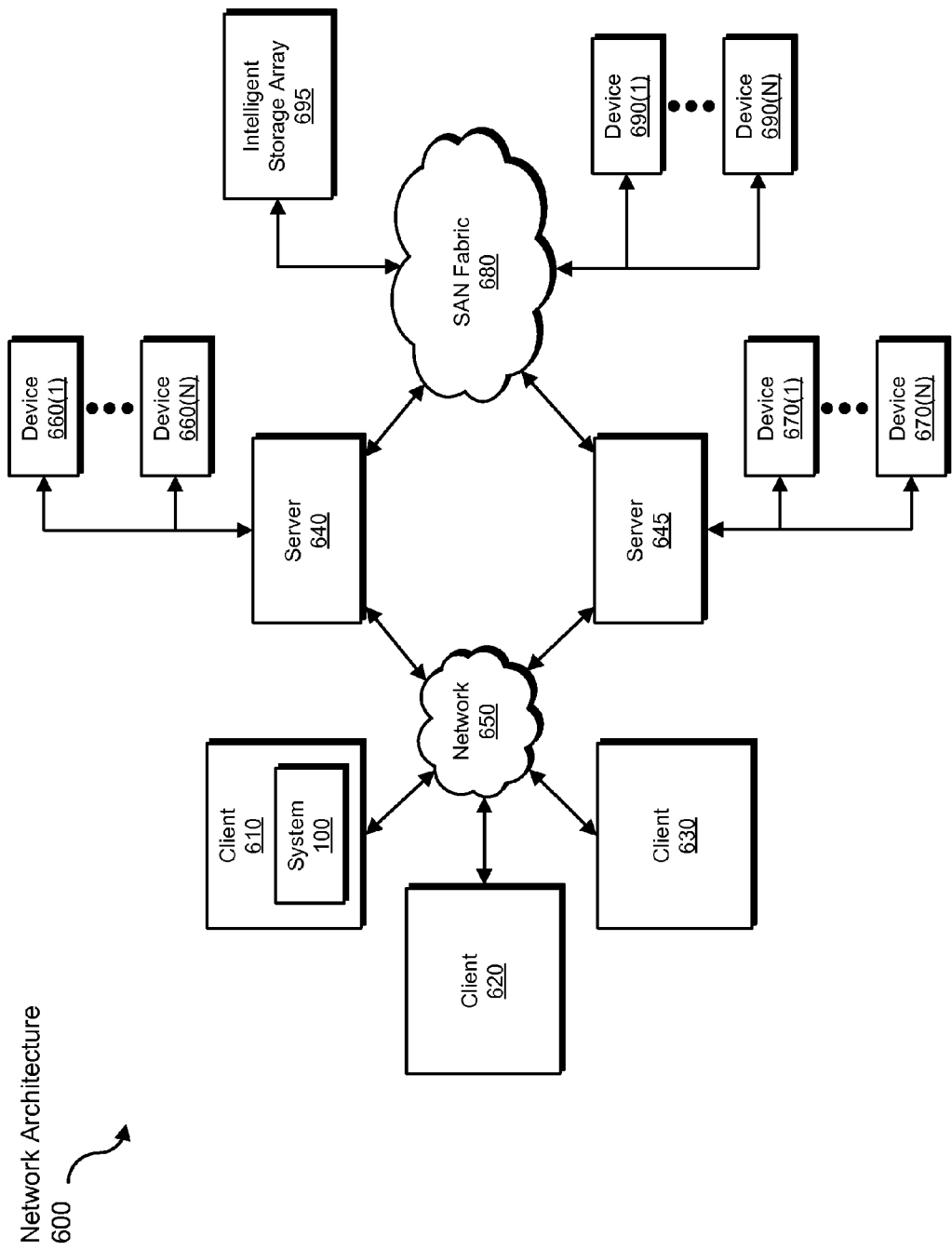
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the maintaining, providing, determining, moving, sending, and using steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for managing malware signatures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a security system into a malware signature management system that performs one or more of the steps disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing malware signatures, at least a portion of the method being performed by a computing device comprising at least one processor, the method comprising:

maintaining a set of active malware signatures;

maintaining a set of dormant malware signatures, wherein each malware signature from the set of dormant malware signatures represents a malware threat that may be less prevalent in a community than each malware signature from the set of active malware signatures;

providing the set of active malware signatures for use in malware detection more frequently than the set of dormant malware signatures by sending the set of active malware signatures to each of a set of clients to be stored at each of the set of clients for use by each of the set of clients in malware detection scans, wherein the set of dormant malware signatures is stored in a cloud-based environment that is accessible to the set of clients;

determining that a threat associated with a first malware signature from the set of dormant malware signatures is becoming more prevalent in the community by determining that the first malware signature from the set of dormant malware signatures has triggered one or more positive malware detection responses;

in response to the determination that the threat associated with the first malware signature from the set of dormant malware signatures is becoming more prevalent, moving the first malware signature from the set of dormant malware signatures to the set of active malware signatures.

2. The method of claim 1, wherein providing the set of active malware signatures for use in malware detection more frequently than the set of dormant malware signatures comprises:

using the set of active malware signatures in client-side signature lookups;

using the set of dormant malware signatures in server-side signature lookups.

3. The method of claim 1, wherein moving the first malware signature comprises providing the first malware signature to each client in the set of clients.

4. The method of claim 1, wherein providing the set of active malware signatures for use in malware detection more frequently than the set of dormant malware signatures comprises:

using the set of active malware signatures in a plurality of server-side signature lookups;

using the set of dormant malware signatures in only a portion of the plurality of server-side signature lookups.

5. The method of claim 1, wherein determining that the first malware signature from the set of dormant malware signatures has triggered one or more positive malware detection responses comprises determining that the first malware signature has triggered positive malware detection responses a predetermined number of times.

6. The method of claim 1, wherein determining that the first malware signature from the set of dormant malware signatures has triggered one or more positive malware detection responses comprises determining that the first malware signature has triggered positive responses at a predetermined rate.

7. The method of claim 1, further comprising:

determining that a threat associated with a second malware signature from the set of active malware signatures is becoming less prevalent in the community by determining that the second malware signature from the set of active malware signatures has triggered positive malware detection responses at a rate that is less than a predetermined threshold;

in response to determining that the threat associated with the second malware signature is becoming less prevalent, moving the second malware signature from the set of active malware signatures to the set of dormant malware signatures.

8. The method of claim 1, further comprising:
maintaining a set of semi-active malware signatures, wherein each malware signature in the set of semi-active malware signatures represents a malware threat that may be more prevalent in the community than each malware signature in the set of dormant malware signatures and less prevalent in the community than each malware signature in the set of active malware signatures;
providing the set of semi-active malware signatures for use in malware detection more frequently than the set of dormant malware signatures and less frequently than the set of active malware signatures;
determining that a threat associated with a second malware signature from the set of dormant malware signatures is becoming more prevalent in the community, but not as prevalent as a malware signature from the set of active malware signatures, by determining that the second malware signature from the set of dormant malware signatures has triggered a positive malware detection responses at a rate that is greater than a predetermined threshold for dormant malware signatures and less than a predetermined threshold for active malware signatures;
in response to the determination that the threat associated with the second malware signature from the set of dormant malware signatures is becoming more prevalent, but not as prevalent as a malware signature from the set of active malware signatures, moving the second malware signature from the set of dormant malware signatures to the set of semi-active malware signatures.

9. A system for managing malware signatures, the system comprising:
at least one hardware processor;
a database configured to store a set of active malware signatures and a set of dormant malware signatures, wherein each malware signature from the set of dormant malware signatures represents a malware threat that may be less prevalent in a community than each malware signature from the set of active malware signatures;
a provisioning module programmed to direct the processor to provide the set of active malware signatures for use in malware detection more frequently than the set of dormant malware signatures by sending the set of active malware signatures to each of a set of clients to be stored at each of the set of clients for use by each of the set of clients in malware detection scans, wherein the set of dormant malware signatures is stored in a cloud-based environment that is accessible to the set of clients;
a determination module programmed to direct the processor to determine that a threat associated with a first malware signature from the set of dormant malware signatures is becoming more prevalent in the community by determining that the first malware signature from the set of dormant malware signatures has triggered one or more positive malware detection responses in one or more malware detection scans;
an update module programmed to direct the processor to, in response to the determination that the threat associated with the first malware signature from the set of dormant malware signatures is becoming more prevalent, move the first malware signature from the set of dormant malware signatures to the set of active malware signatures.

10. The system of claim 9, wherein the provisioning module provides the set of active malware signatures for use in malware detection more frequently than the set of dormant malware signatures by:

using the set of active malware signatures in client-side signature lookups;
using the set of dormant malware signatures in server-side signature lookups.

11. The system of claim 9, wherein the update module is programmed to direct the processor to move the first malware signature by directing the processor to provide the first malware signature to each client in the set of clients.

12. The system of claim 9, wherein the provisioning module is programmed to direct the processor to provide the set of active malware signatures for use in malware detection more frequently than the set of dormant malware signatures by:
using the set of active malware signatures in a plurality of server-side signature lookups;
using the set of dormant malware signatures in only a portion of the plurality of server-side signature lookups.

13. The system of claim 9, wherein the determination module is programmed to direct the processor to make the determination by directing the processor to determine that the first malware signature from the set of dormant signatures has triggered positive malware detection responses a predetermined number of times.

14. The system of claim 9, wherein the determination module is programmed to direct the processor to make the determination by directing the processor to determine that the first malware signature has triggered positive responses at a predetermined rate.

15. The system of claim 9, wherein the determination module is further programmed to direct the processor to:
determine that a threat associated with a second malware signature from the set of active malware signatures is becoming less prevalent in the community by determining that the second malware signature from the set of active malware signatures has triggered positive malware detection responses at a rate that is less than a predetermined threshold;
in response to determining that the threat associated with the second malware signature is becoming less prevalent, move the second malware signature from the set of active malware signatures to the set of dormant malware signatures.

16. The system of claim 9, wherein:
the database is further configured to store a set of semi-active malware signatures, wherein each malware signature in the set of semi-active malware signatures represents a malware threat that may be more prevalent in the community than each malware signature from the set of dormant malware signatures and less prevalent in the community than each malware signature from the set of active malware signatures;
the provisioning module is further programmed to direct the processor to provide the set of semi-active malware signatures for use in malware detection more frequently than the set of dormant malware signatures and less frequently than the set of active malware signatures;
the determination module is further programmed to direct the processor to determine that a threat associated with a second malware signature from the set of dormant malware signatures is becoming more prevalent in the community, but not as prevalent as a malware signature from the set of active malware signatures, by determining that the second malware signature from the set of dormant malware signatures has triggered a positive malware detection responses at a rate that is greater than a predetermined threshold for dormant malware signatures and less than a predetermined threshold for active malware signatures;

the update module is further programmed to direct the processor to, in response to the determination that the threat associated with the second malware signature from the set of dormant malware signatures is becoming more prevalent, but not as prevalent as the malware signature from the set of active malware signatures, move the second malware signature from the set of dormant malware signatures to the set of semi-active malware signatures.

17. A non-transitory computer-readable-storage medium comprising one or more computer-executable instructions that, when executed by at least one processor of a computing device, cause the computing device to:
  maintain a set of active malware signatures;
  maintain a set of dormant malware signatures, wherein each malware signature from the set of dormant malware signatures represents a malware threat that may be less prevalent in a community than each malware signature from the set of active malware signatures;
  provide the set of active malware signatures for use in malware detection more frequently than the set of dormant malware signatures by sending the set of active malware signatures to each of a set of clients to be stored at each of the set of clients for use by each of the set of clients in malware detection scans, wherein the set of dormant malware signatures is stored in a cloud-based environment that is accessible to the set of clients;
  determine that a threat associated with a first malware signature from the set of dormant malware signatures is becoming more prevalent in the community by determining that the first malware signature from the set of dormant malware signatures has triggered one or more positive malware detection responses;
  in response to the determination that the threat associated with the first malware signature from the set of dormant malware signatures is becoming more prevalent, move the first malware signature from the set of dormant malware signatures to the set of active malware signatures.

18. The computer-readable-storage medium of claim 17, wherein the one or more computer-executable instructions cause the computing device to provide the set of active malware signatures for use in malware detection more frequently than the set of dormant malware signatures by causing the computing device to:
  use the set of active malware signatures in client-side signature lookups;
  use the set of dormant malware signatures in server-side signature lookups.

19. The computer-readable-storage medium of claim 17, wherein the one or more computer-executable instructions cause the computing device to move the first malware signature by causing the computing device to provide the first malware signature to each client in the set of clients.

20. The computer-readable-storage medium of claim 17, wherein the one or more computer-executable instructions further cause the computing device to:
  determine that a threat associated with a second malware signature from the set of active malware signatures is becoming less prevalent in the community by determining that the second malware signature from the set of active malware signatures has triggered positive malware detection responses at a rate that is less than a predetermined threshold;
  in response to determining that the threat associated with the second malware signature is becoming less prevalent, move the second malware signature from the set of active malware signatures to the set of dormant malware signatures.

* * * * *

UNITED STATES PATENT AND TRADEMARK OFFICE
CERTIFICATE OF CORRECTION

PATENT NO. : 9,171,156 B1
APPLICATION NO. : 14/492754
DATED : October 27, 2015
INVENTOR(S) : Walter Bogorad and Vadim Antonov It is certified that error appears in the above-identified patent and that said Letters Patent is hereby corrected as shown below:

Claims

Claim 8, at column 17, lines 13 to 23, should read:

determining that a threat associated with a second malware signature from the set of dormant malware signatures is becoming more prevalent in the community, but not as prevalent as a malware signature from the set of active malware signatures, by determining that the second malware signature from the set of dormant malware signatures has triggered positive malware detection responses at a rate that is greater than a predetermined threshold for dormant malware signatures and less than a predetermined threshold for active malware signatures;

Claim 16, at column 18, lines 56 to 67, should read:

the determination module is further programmed to direct the processor to determine that a threat associated with a second malware signature from the set of dormant malware signatures is becoming more prevalent in the community, but not as prevalent as a malware signature from the set of active malware signatures, by determining that the second malware signature from the set of dormant malware signatures has triggered positive malware detection responses at a rate that is greater than a predetermined threshold for dormant malware signatures and less than a predetermined threshold for active malware signatures;

Signed and Sealed this
Twenty-first Day of June, 2016

Michelle K. Lee
*Director of the United States Patent and Trademark Office*